Aug. 11, 1925.

L. Y. SQUIBB 1,549,336

AUTOMATIC ELECTRICAL WINDING APPARATUS FOR SPRING MOTORS

Original Filed April 28, 1916  2 Sheets-Sheet 1

WITNESS
F.J.Hartman.

INVENTOR
Lloyd Y. Squibb.
BY Hulon V. Blount
ATTORNEYS

Aug. 11, 1925. 1,549,336
L. Y. SQUIBB
AUTOMATIC ELECTRICAL WINDING APPARATUS FOR SPRING MOTORS
Original Filed April 28, 1916   2 Sheets-Sheet 2
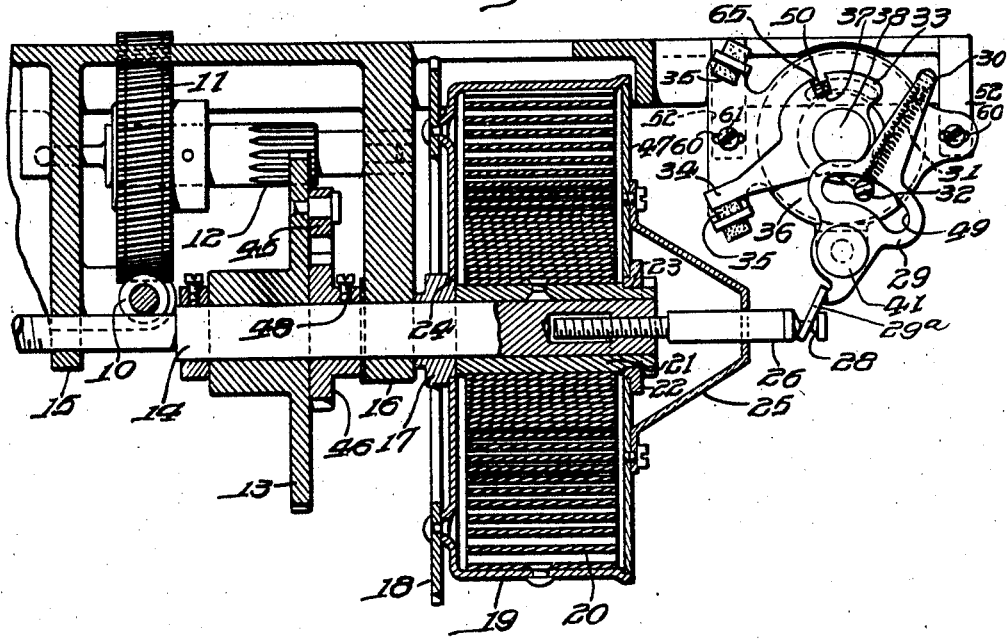
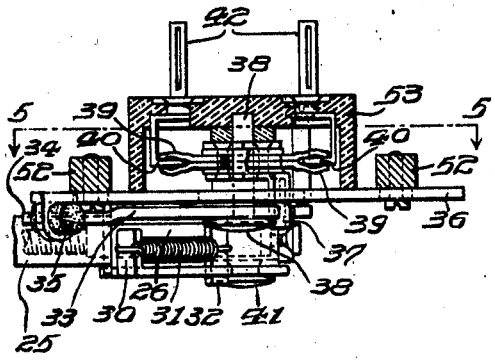
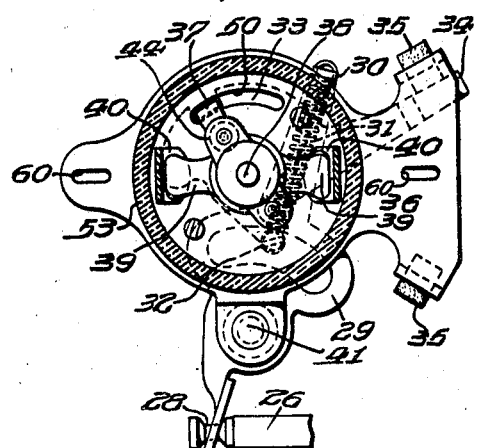
INVENTOR
Lloyd Y. Squibb.
BY Fenton V Blount
ATTORNEYS
WITNESS
F. J. Hartman Patented Aug. 11, 1925.

1,549,336

UNITED STATES PATENT OFFICE.

LLOYD Y. SQUIBB, OF CAMDEN, NEW JERSEY, ASSIGNOR TO VICTOR TALKING MACHINE COMPANY, A CORPORATION OF NEW JERSEY.

AUTOMATIC ELECTRICAL WINDING APPARATUS FOR SPRING MOTORS.

Application filed April 28, 1916, Serial No. 94,117. Renewed April 23, 1924.

*To all whom it may concern:*

Be it known that I, LLOYD Y. SQUIBB, a citizen of the United States, residing in Camden, county of Camden, State of New Jersey, have invented certain new and useful Improvements in Automatic Electrical Winding Apparatus for Spring Motors, of which the following is a specification.

My invention relates to means for electrically keeping under actuating tension, automatically, the spring of a motor, and is especially applicable to a motor whose shaft is employed to drive the rotatable turntable of a talking machine, and has for its object to make it possible to run a spring motor continuously over long periods of time and to keep the driving spring under tension considerably lower than that to which it is subjected when fully wound, and considerably more than that which it retains when fully unwound, thus utilizing for the actuation of the motor the spring tension best suited for the purpose, making the range of governor control less extended and the speed of the motor more uniform.

A further object of my invention is to produce a governor controlled spring motor which is adapted to rotate a sound record tablet over long periods of time and at a speed so constant that there will be no false variations in the pitch or key of the selections being reproduced from such sound record tablet. My invention has for its further object to so control the electric motor as to limit its actuation to properly timed intervals.

To effect these objects my invention consists of the elements and their novel construction and arrangement in combination, hereinafter described, and pointed out in the appended claims.

Figure 1:
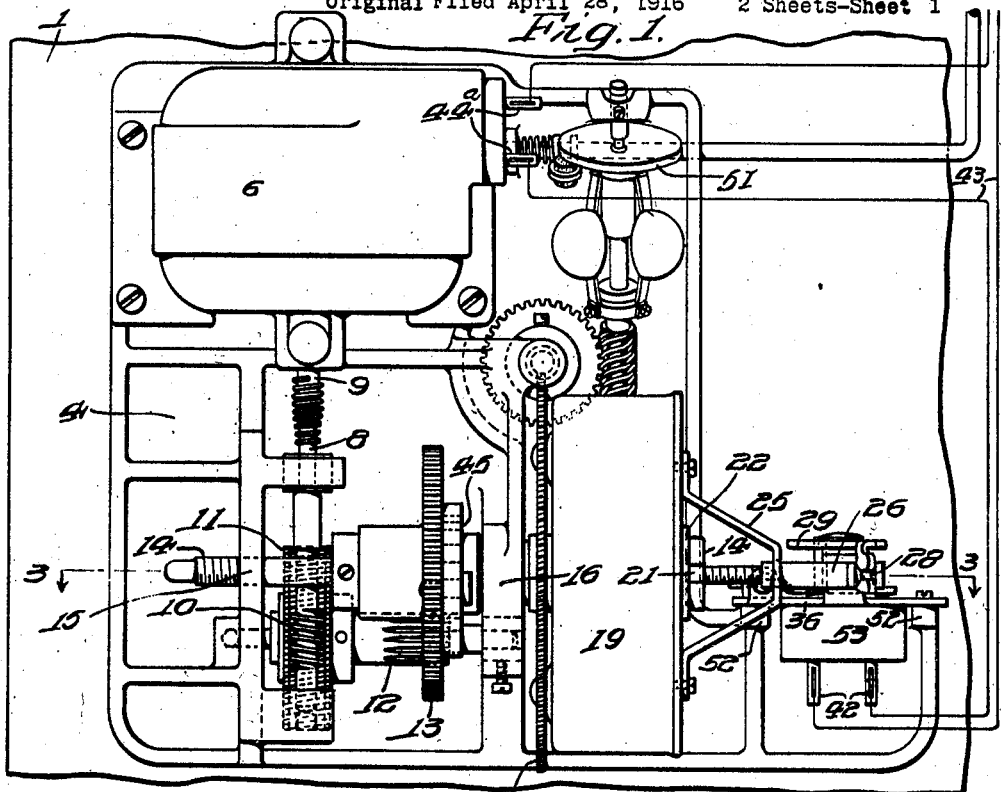
Figure 2:
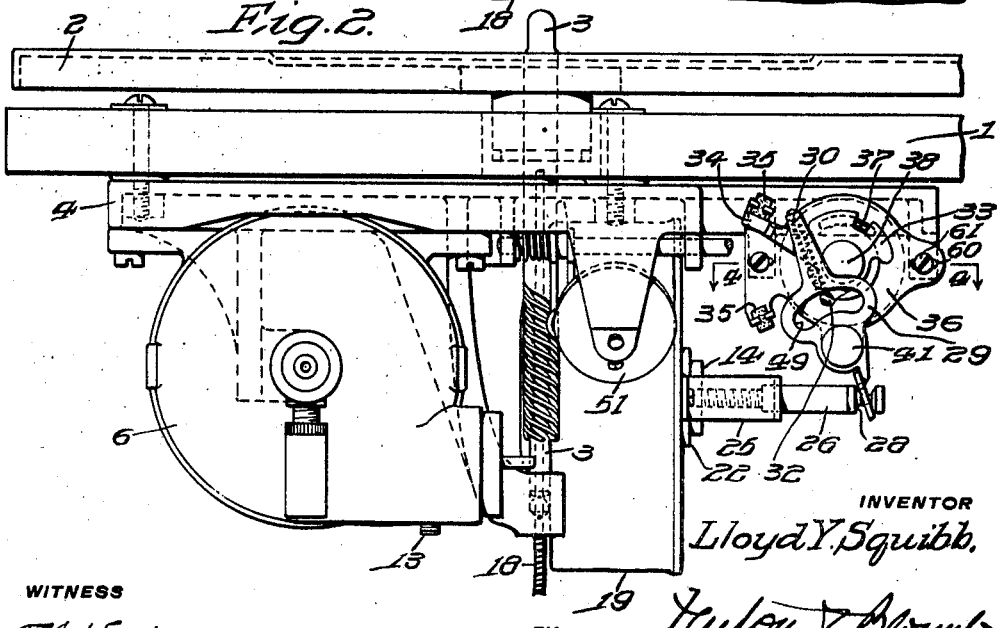

In the accompanying drawings forming part of this specification, Figure 1 is a plan view, looking upwards, of the combined electric motor, spring motor, and connections of each, all mounted upon a bed plate which is secured to the basal side of the usual motor supporting board of a talking machine; and Fig. 2 is a side view thereof, but with certain parts shown in outline only. Fig. 3 is a fragmentary section in vertical plane, on line 3—3 of Fig. 1; Fig. 4 is a vertical section on line 4—4 of Fig. 2, and Fig. 5 is a like section on line 5—5 of Fig. 4.

Referring now to said drawings, the numeral 1 designates the usual horizontally-disposed motor supporting board of a talking machine; and 4 the base plate, mounted on the underside thereof and supporting the spring motor and the electric motor and their connections; this base plate being provided with bearings for the requisite shafts and other driving and connecting gearing. The turntable 2 of the machine is mounted on the spindle 3 by which it is directly rotated, the speed of the spindle being controlled by a known form of governor 51. The electric motor, indicated at 6 (see Fig. 1) and mounted on the base plate 4, has a shaft 9 which is flexibly connected by means of a coiled spring coupling to a driving stub shaft 8 having on it a worm gearing 10, whereby power is transmited to the worm gearing 11 and thence to the gear 13 through the gear 12, the gear 13 being loosely mounted on the shaft 14, and having upon one face thereof a pawl 45 coacting with the ratchet 46 (see Fig. 3) which is secured, by screw 48, to the shaft 14. Through this system of gearing the power developed in the electric motor 6 is transmitted through the shaft 14, which operates as the winding shaft of the spring motor; though, as will be seen by reference to Figs. 1 and 3, the free end of this shaft 14 is extended and threaded whereby an ordinary winding key may be removably attached to it to manually actuate it if and when desired, the pawl and ratchet 45 and 46 operating, in either case, to prevent an unwinding action.

Bearings for the shaft 14 are provided by the frame bars 15 and 16 of the base plate 4; and upon the shaft 14 is a collar 17 which turns thereon and which is central of the worm gear 18 and also of the spring barrel 19 which is fast with said collar 17 (see Figs. 3 and 2) and which is concentrically mounted on the shaft 14; the spring barrel being provided with the sleeve 21 which is held in interlocking relation with and on the shaft 14 by suitable means correspondingly arranged upon the connected parts.

A cover 47 for the spring barrel 19 has mounted fast upon it the member 25, and said member 25 has a squared opening and coacts with a squared shaft 26, which at one end is threaded to enter a threaded aperture in the end of shaft 14; while the other and free end of this squared shaft, which projects through the squared opening in the member 25 is peripherally grooved, as at 28, for a purpose hereinafter described. Between the spring barrel cover 47 and the sleeve 21 is interposed a collar 22 which is freely rotatable on the bearing 23 of the sleeve 21. Similarly, the collar 17 is forced tightly into the opening 24 of the barrel, to turn with said barrel 19 but is free to rotate with the barrel 19 on the shaft 14. One end of the main spring 20 is connected to the sleeve 21 and the other end thereof is secured to the spring barrel 19. By reason of this construction and arrangement of the elements it will be seen that while the shaft 14 is rotated by the electric motor to wind the spring 20, the gear 18 is held relatively stationary by the parts driven by it; and when the spring unwinds to give up its tension in the operation of the turntable spindle 3, through the gear 18, the shaft 14 is relatively stationary, the collar 17 of the spring barrel turning upon the shaft 14 and the collar 22 turning on the sleeve 21 which is fast to the shaft.

By reason of the construction stated, the squared shaft 26 will either recede or advance, by its threaded end, into the threaded aperture in the shaft 14, depending upon whether the motor spring is being wound up by the shaft 14 in rotation or unwound by giving up its tension in the operation of the machine. In the drawings the squared shaft 26 is shown so threaded as to advance into the shaft 14 when the latter is being rotated to tension or wind the spring 20. This squared shaft forms the controlling or governing mechanism of the device.

Referring now to Figs. 2 and 3, mounted upon the base plate 4, is the coacting mechanism consisting of the member 29 which has a vibratory motion on a pivot bearing 41. It has a forked end 29ª which embraces the peripheral groove 28 in the free end of shaft 26 thereby forming a flexible connection or coupling between the members 29 and 26. The forked end 29ª and the member 29 are accordingly reciprocated by and with said shaft 26 when the latter has longitudinal motion imparted to it. The body of the member 29 has a curved slot 49 into which projects a post 32 formed upon the face of an oscillatory member 33 hereinafter described.

The member 29 has an elongated free end 30, between which and the aforesaid post 32 a spring 31 is secured by its opposite ends; the function of which is to quickly throw the oscillatory member 33 to reverse position. The oscillatory member 33 and the vibratory member 29 are mounted by their respective pivotal bearings 38 and 41 on the plate 36 which is secured to the frame bars 52—52 of the base plate 4; and through an arcuate slot 50 in this plate 36, there extends a projection 37 which engages notch 65 in the peripheral edge of the oscillatory member 33 which is also provided with a central pivotal bearing 38, and has an arm 34 whose limits of play are controlled by stops 35 on the plate 36 interposed in the path of its swinging movement.

The projection 37 is bent and is rigidly secured to an arm 44 upon an electric switch mounted on the reverse side of the plate 36. This switch, see Figs. 4 and 5, is provided with jaws 39, 39, which, as shown in the drawings, are positioned upon contact points 40, 40, when the current is turned on. These jaws are pivoted upon the pin 38, and the contact points communicate electrically with the terminals 42. As this construction of rotary switch is well known, no further description of it is necessary.

By referring to Fig. 3, it will be apparent that the longitudinal movements of the squared shaft 26, will swing the pivoted vibratory member 29, and when its arm 30 is swung, for example, from the position shown in Fig. 3 to the other side of the pivot 38, the arm 30 and post 32 will be out of alinement with the axis of the pivot 38 and on the opposite side thereof with the result that the pull of the spring 31 will shift the arm 34 from the lower pad 35 to the upper pad 35. The arm 37 being attached to and moving with the jaws of the switch moves the latter into the position shown in Fig. 2 which is that wherein the current is thrown on to effect the regulated winding action of the combined motors.

By suitably constructing the pitch of the threads on the squared shaft 26 and correspondingly of the threaded aperture in the shaft 14, and by suitably positioning the squared shaft in the squared aperture in the member 25, the extent of movement of the arm 37 which directly controls the switch, may be accurately regulated to govern the action of the spring 20 of the winding motor, as between a full winding and a full unwinding, thereby utilizing only that portion of the possible tension of the spring which is strongest, most regular, best controlled by the governor, and producing most nearly uniform speed and power in rotation. Briefly stated, the full range of movement of the switch actuating elements of the device is shown by comparing their relative position shown in Fig. 2 with that shown in Fig. 3. During the unwinding of the motor spring the rotating spring barrel and its adjunctive member 25 operate to move the squared shaft 26 from the wound position shown in Fig. 2, to the unwound position shown in Fig. 3, just previous to which the vibratory member 29 and its spring 31 have suitably moved the oscillatory member 33 whereby its arm 34 is brought into contact with the lower pad 35, and the projecting arm 37 has moved, with the notch 65, the arm 37 being within the curved slot 50, and in the position of said elements shown in Fig. 5, the jaws 39 are brought into contact with the contact points 40, whereby current is put on to actuate the electric motor, during which operation the spring barrel is not rotated although the motor shaft is rotated to wind the spring at the same time. As the squared shaft is held from rotation by the adjunctive member 25 and the winding shaft is being rotated, the squared shaft is consequently moved longitudinally by reason of the action of the threaded portions of the winding shaft and the squared shaft. The squared shaft is at the same time permitted to slide through the adjunctive member 25 and thus in the construction shown is caused to move outwardly from within said winding shaft, and continues so to do until the parts first above described assume the position shown in Fig. 2, throwing the switching arm 34 into contact with the upper pad 35, the proper positioning of both pads limiting the throw of the arm 34 of the oscillatory member. The described action of the squared shaft may be varied by adjustably shifting the oscillatory member 33 and its adjunctive parts, to the extent permitted by the screw and slot adjustment means 60—61 upon the lugs or brackets 52, and in consequence the turning on and turning off of the current to operate or stop the operation of the electric motor may be caused to occur at less than full winding or full unwinding of the spring motor.

Having thus fully described my invention, I claim and desire to protect by Letters Patent of the United States:

1. A motor mechanism comprising in combination a supporting frame, an electric motor, a winding shaft actuated thereby and having an interiorly threaded end, a spring motor wound by said shaft, an exteriorly threaded shaft threaded into the threaded interior of said winding shaft, means connected to said spring motor to rotate said exteriorly threaded shaft to effect a longitudinal movement of said exteriorly threaded shaft with respect to said winding shaft, and means actuated by said exteriorly threaded shaft to control said electric motor.

2. Motor mechanism comprising in combination a supporting frame, an electric motor, a shaft actuated thereby, a spring motor having a casing and wound by said shaft, a yoke fastened to the spring motor casing and partaking of its motion, an adjustable member rotating with the yoke and slidable therethrough and provided with screw threads to coact with corresponding threads in said shaft, a vibratory member moved about its axis by said adjustable member, a flexible member, an oscillatory member joined by said flexible member to the vibratory member and stops between which said oscillatory member is moved by the vibratory member.

3. In a spring motor mechanism, the combination of a winding shaft, an electric motor, gearing to transmit the motion of said electric motor to said winding shaft and to prevent the unwinding of said shaft, a snap switch mechanism for making and breaking the circuit of said electric motor, and means mounted on the end of said winding shaft to automatically throw said switch to break the circuit when the spring motor is fully wound and to make the circuit when said spring motor is practically unwound.

4. In a spring motor mechanism, the combination of a winding shaft, means on one end of said shaft to which to attach a manually operated winding key, an electric motor, gearing to transmit the motion of said electric motor to said winding shaft and to prevent the unwinding of said shaft, a snap switch mechanism for making and breaking the circuit of said electric motor, and means mounted on the opposite end of said winding shaft to automatically throw said switch to break the circuit when the spring motor is fully wound and to make the circuit when said spring motor is practically unwound.

5. In a spring motor mechanism, the combination of a winding shaft, a spring drum mounted to turn on said shaft, an electric motor, gearing to transmit the motion of said electric motor to said winding shaft and to prevent the unwinding of said shaft, a snap switch mechanism for making and breaking the circuit of said electric motor, and means mounted on the end of said winding shaft and movable axially of said shaft by the relative movement between said winding shaft and said spring drum to automatically throw said switch to break the circuit when the spring motor is fully wound and to make said circuit when said spring motor is practically unwound.

6. In a spring motor mechanism, the combination of a winding shaft, a spring drum mounted to turn on said shaft, means on one end of said shaft to which to attach a manually operated winding key, an electric motor, gearing to transmit the motion of said electric motor to said winding shaft and to prevent the unwinding of said shaft, a snap switch mechanism for making and breaking the circuit of said electric motor, and means mounted on the opposite end of said shaft and movable axially of said shaft by the relative movement between said winding shaft and said spring drum to automatically throw said switch to break the circuit when the spring motor is fully wound and to make the circuit when said spring motor is practically unwound.

7. In a spring motor mechanism, the combination of a casing, a winding shaft therein and rotatable relative thereto, a spring coil in said casing and having one end secured to said shaft and the other end secured to said casing, an extension shaft threaded in one end of said winding shaft, and means between said extension shaft and said casing to prevent the relative rotation of said extension shaft with respect to said casing.

In witness whereof, I have hereunto set my hand this 27th day of April, A. D., 1916.

LLOYD Y. SQUIBB.